United States Patent
Kawata

Patent Number: 5,388,193
Date of Patent: Feb. 7, 1995

[54] SYMMETRICAL DECODER

[75] Inventor: Tetsuro Kawata, Kanagawa, Japan

[73] Assignee: Fuji Xerox Co., Ltd., Tokyo, Japan

[21] Appl. No.: 64,673

[22] Filed: May 21, 1993

Related U.S. Application Data

[63] Continuation of Ser. No. 897,743, Jun. 12, 1992, abandoned.

[30] Foreign Application Priority Data

Jun. 14, 1991 [JP] Japan .................. 3-143186

[51] Int. Cl.⁶ .............................. G06F 15/62
[52] U.S. Cl. .................... 395/143; 395/157; 395/800; 395/2
[58] Field of Search ............ 395/2, 143, 157, 800

[56] References Cited

U.S. PATENT DOCUMENTS

| | | | |
|---|---|---|---|
| Re. 31,509 | 1/1984 | Neidell | 343/9 R |
| 3,895,253 | 7/1975 | Schwartz et al. | 315/13 |
| 3,996,585 | 11/1976 | Hogan et al. | 395/141 |
| 4,910,719 | 3/1990 | Thubert | 367/125 |
| 4,949,286 | 8/1990 | Ohba | 364/521 |
| 5,038,302 | 8/1991 | Kaufman | 395/141 |

*Primary Examiner*—Jack B. Harvey
*Assistant Examiner*—Ayaz R. Sheikh
*Attorney, Agent, or Firm*—Finnegan, Henderson, Farabow, Garrett & Dunner

[57] ABSTRACT

A decoder used for graphic processing or the like. The decoder includes a first input unit for inputting coordinates of two points, a second input unit for inputting a direction between the two points, and an operation unit for logically operating a relationship between the two points utilizing a symmetry of coordinates on the basis of data supplied from the first and second input units. According to the decoder, the scale of the circuit can be reduced.

4 Claims, 3 Drawing Sheets

SYMMETRICAL DECODER

This application is a continuation of application Ser. No. 07/897,743, filed Jun. 12, 1992, now abandoned.

BACKGROUND OF THE INVENTION

1. Field of the Invention

The present invention relates to a decoder, and particularly relates to a decoder used for graphic processing or the like.

2. Description of the Related Art

In a digital circuit for performing graphic processing or the like, there is a case which requires a decoder supplied with coordinates of two points to decode an output signal expressing the relationship between the two points. An example thereof will be described with reference to FIG. 2.

In FIG. 2, reference numeral 20 represents a window of one dot in X- and Y-coordinate axes. The solid lines show borders per one dot, and the dotted lines show borders per 0.5 dot. The window 20 is constituted by four areas A, B, C and D separated by the borders per 0.5 dot, and the respective areas A, B, C and D are sets of points respectively satisfying the conditions of $\{P_a(x_a,y_a)|0 \leq x_a < 0.5, 0.5 \leq y_a < 1.0\}$, $\{P_b(x_b,y_b)|0.5 \leq x_b < 1.0, 0.5 \leq y_b < 1.0\}$, $\{P_c(x_c,y_c)|0 \leq x_c < 0.5, 0 \leq y_c < 0.5\}$, and $\{P_d(x_d,y_d)|0.5 \leq x_d < 1.0, 0 \leq y_d < 0.5\}$.

Now, it is assumed that two points $P_i$ and $P_j$ supplied into a decoder are both in $\{(x,y)|0 \leq x < 1.0, 0 \leq y < 1.0\}$ within the window 20, and that the two points are respectively within two of the four areas A, B, C and D which are diagonal to each other. That is, $(P_i,P_j) \to \{(A,D),(D,A),(B,C),(C,B)\}$, (in which $(P_i,P_j) \to (A,D)$)

expresses that the point $P_i$ belongs to the area A and the point $P_j$ belongs to the area D). The decoder outputs a signal uplow which shows whether the straight line connecting the points $P_i$ and $P_j$ exists above a center point of the window 20 (including the case where the straight line passes through the center point) or below the center point. Conventionally, this decoder is constituted in accordance by a method in which all the combinations of the coordinates of two points supplied thereto are decoded as they are. A circuit configuration using this method will be described more in detail.

Now, it is assumed that the coordinates of the two inputted points $P_i$ and $P_j$ are expressed with the accuracy of three bits down to the decimal place. In FIG. 2, the window 20 divided into four areas is divided into 64 lattice points by coordinates having values of three bits down to the decimal place so that 16 lattice points are included in each of the areas A to D. The sets of 16 lattice points included in each of the areas A, B, C and D are named A0 to A15, B0 to B15, C0 to C15, and D0 to D15, as shown in FIG. 3.

In order to obtain a signal uplow, it is necessary to decode all the combinations of the two points for the straight lines $P_iP_j$ passing above the lattice point B0 for the every case of $(P_i,P_j) \to \{(C,B),(B,C),(A,D),(D,A)\}$.

For example, in the case of $(P_i,P_j) \to (C,B)$, the combinations making the signal uplow active are as follows.

TABLE 1

| $P_i$ | $P_j$ |
|---|---|
| C0 | B0,B4,B5,B8,B9,B10,B12,B13,B14,B15 |
| C1 | B0,B4,B8,B9,B12,B13,B14 |
| C2 | B0,B4,B8,B9,B12,B13 |
| C3 | B0,B4,B8,B12 |
| C4 | B0,B4,B5,B8,B9,B10,B12,B13,B14,B15 |
| C5 | B0,B4,B5,B8,B9,B10,B12,B13,B14,B15 |
| C6 | B0,B4,B8,B9,B12,B13,B14 |
| C7 | B0,B4,B8,B12,B13 |
| C8 | B0,B4,B5,B6,B8,B9,B10,B11,B12,B13,B14,B15 |
| C9 | B0,B4,B5,B8,B9,B10,B11,B12,B13,B14,B15 |
| C10 | B0,B4,B5,B8,B9,B10,B12,B13,B14,B15 |
| C11 | B0,B4,B8,B9,B12,B13 |
| C12 | B0,B4,B5,B6,B7,B8,B9,B10,B11,B12,B13,B14,B15 |
| C13 | B0,B4,B5,B6,B7,B8,B9,B10,B11,B12,B13,B14,B15 |
| C14 | B0,B4,B5,B6,B8,B9,B10,B11,B12,B13,B14,B15 |
| C15 | B0,B4,B5,B8,B9,B10,B12,B13,B14,B15 |

A signal-uplow decoder may be constituted by decoding and logical OR circuits, in which the decoding circuit output signals expressing the correspondence between the inputted coordinates $P_i$ and $P_j$ and the foregoing combinations. Therefore, a conventional decoder for the signal uplow has such a circuit configuration as shown in FIG. 4, so that a logical OR circuit 25 outputs a signal level which takes a value of UPLOW=1 if the straight line $P_iP_j$ passes on or above the lattice point B0, while takes a value of UPLOW=0 if it passes below the lattice point B0.

In FIG. 4, the decoder comprises a first decoding circuit 21, a second decoding circuit 22, a third decoding circuit 23, a fourth decoding circuit 24, and the above-mentioned logical OR circuit 25. The first to fourth decoding circuits 21 to 24 are for decoding the combinations of coordinates corresponding to $(P_i,P_j) \to \{(C,B),(B,C),(A,D),(D,A)\}$ respectively, and each of the decoding circuits 21 to 24 is supplied with a 3-bit signal expressing the coordinates of the point $P_i$ and another 3-bit signal expressing the coordinates of the point $P_j$. Each of decoding circuits 21 to 24 outputs a signal for every combination of coordinates which makes the signal uplow active. The logical OR circuit 25 performs logical ORing among all the outputs of the first to fourth decoding circuits 21 to 24 to thereby output the signal uplow.

However, in such a method of decoding combinations of coordinates of two inputted points as they are, the number of the combinations of coordinates is so large that a number of decoding circuits (four in this conventional example) is required. Thus, there is a problem that the scale of the circuit is so large that the speed of operating is low, and the cost is high.

SUMMARY OF THE INVENTION

It is therefore an object of the present invention to solve the foregoing problem.

It is another object of the present invention to provide a small-sized high-speed decoder used for graphic processing or the like.

In order to attain the above objects, the present invention provides a symmetrical decoder including first input means for inputting coordinates of two points, second input means for inputting a direction between the two points, and operation means for logically operating a relationship between the two points utilizing a symmetry of coordinates on the basis of data supplied from the first and second input means.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

An embodiment of the present invention will be described with reference to the drawings.

Figure 1:
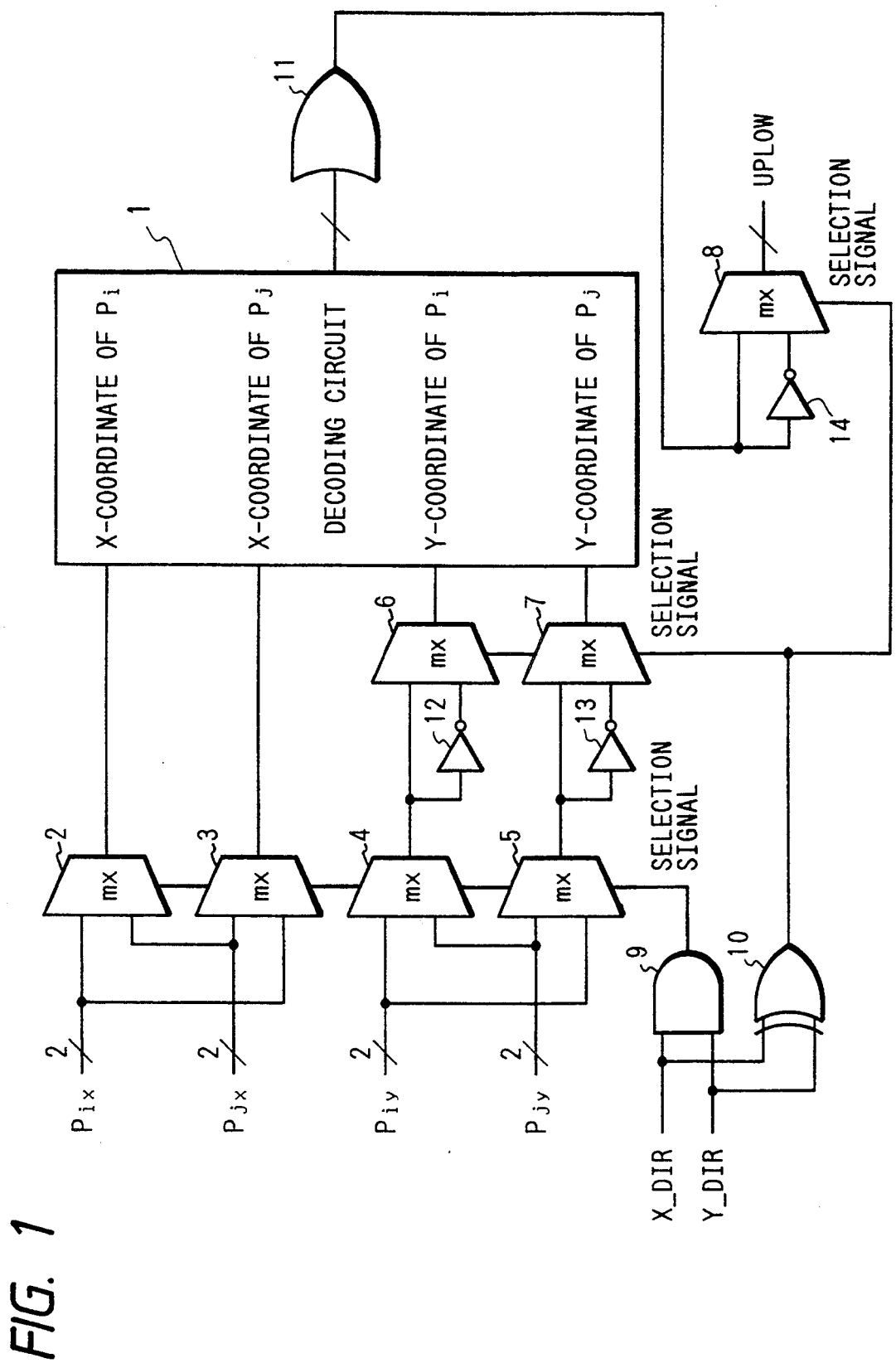
FIG. 1 is a block diagram illustrating a symmetrical decoder according to an embodiment of the present invention.
Figure 2:
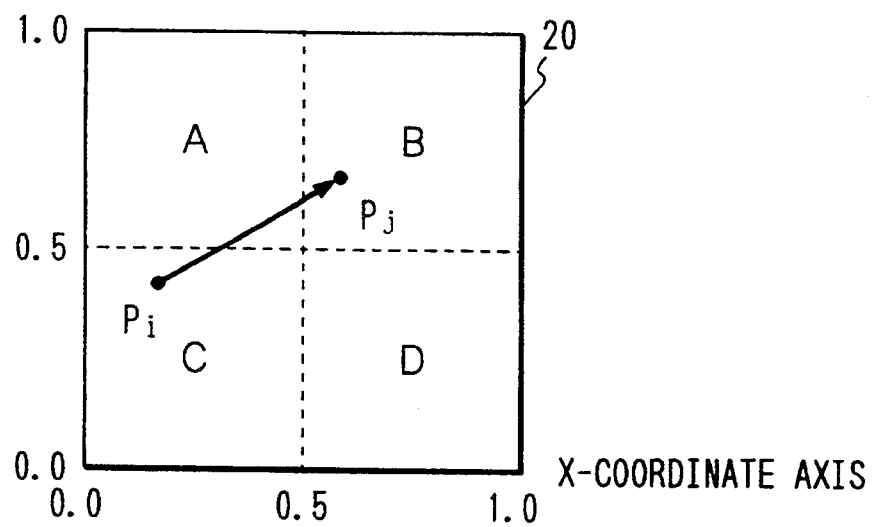
FIG. 2 is a diagram illustrating a one-dot window in the X- and Y-coordinate axes in the case of graphic processing by a decoder.

FIG. 1 shows an embodiment of the decoder according to the present invention. In FIG. 1, the decoder comprises a decoding circuit 1, a first multiplexer 2, a second multiplexer 3, a third multiplexer 4, a fourth multiplexer 5, a fifth multiplexer 6, a sixth multiplexer 7, a seventh multiplexer 8, an AND circuit 9, an EXOR circuit 10, an OR circuit 11, a first inverter 12, a second inverter 13, and a third inverter 14.

Figure 4:
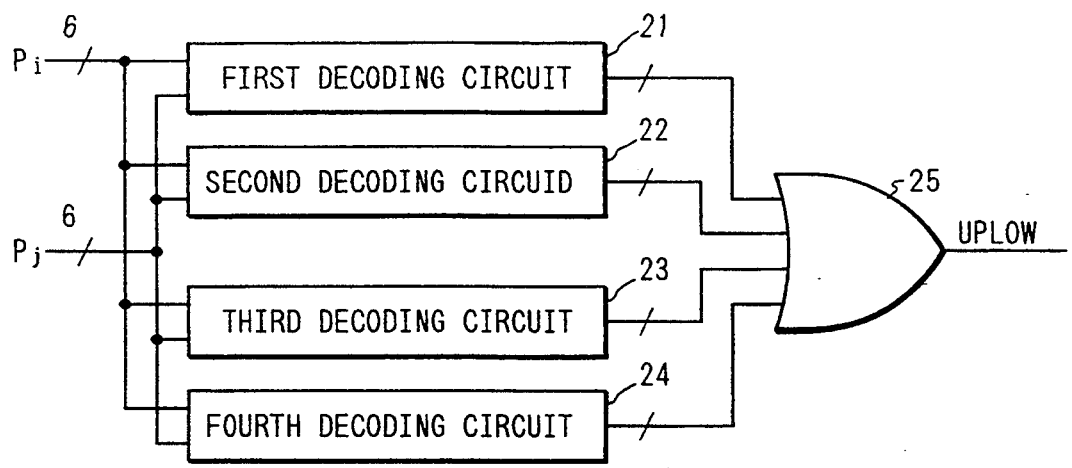
FIG. 4 is a block diagram illustrating a conventional decoding circuit.

The decoding circuit 1 has quite the same function as that of the decoding circuit 21 in FIG. 4 for decoding only the combinations making a signal uplow active in the case of $(P_i,P_j) \rightarrow (C,B)$. That is, the decoding circuit 1 decodes all the combinations in Table 1. The difference point of the decoding circuit 1 of FIG. 1 from the decoding circuit 21 of FIG. 4 is that the decoding circuit 1 decodes combinations in four cases and is supplied with four bits for every coordinate of the points $P_i$ and $P_j$ since the most significant bits of the coordinates of the points $P_i$ and $P_j$ are not necessary, while the decoding circuit 21 decodes combinations in one case and is supplied with six bits for every coordinate of points $P_i$ and $P_j$. This is because the points $P_i$ and $P_j$ are assumed so as to be within the areas C and B respectively. It is therefore unnecessary to supply the value of one bit down to the decimal place into the decoder.

The multiplexer 2 is supplied, as its first input, with the X coordinate of the point Pi (hereinafter denoted as "$P_{ix}$"), and is supplied, as its second input, with the X coordinate of the point $P_j$ (hereinafter denoted as "$P_{jx}$"). The multiplexer 3 is supplied with $P_{jx}$ as its first input, and $P_{ix}$ as its second input. The multiplexer 4 is supplied, as its first input, with the Y coordinate of the point $P_i$ (hereinafter denoted as "$P_{iy}$"), and is supplied, as its second input, with the Y coordinate of the point $P_j$ (hereinafter denoted as "$P_{jy}$"). The multiplexer 5 is supplied with $P_{jy}$ as its first input, and $P_{iy}$ as its second input. The multiplexer 6 is supplied with the output of the multiplexer 4 as its first input, and the output of the inverter 12 as its second input. The multiplexer 7 is supplied with the output of the multiplexer 5 as its first input, and the output of the inverter 13 as its second input. The multiplexer 8 is supplied with the output of the OR circuit 11 as its first input, and the output of the inverter 14 as its second input. The multiplexers 2 to 8 select and output their first inputs when the values of selection signals are "0", and select and output their second inputs when the values of the selection signals are "1". The selection signal for the multiplexers 2 to 5 is an output signal of the AND circuit 9, and the selection signal for the multiplexers 6 to 8 is an output signal of the exclusive OR circuit 10.

The AND circuit 9 is supplied with a signal X_DIR (expressing the positive direction when "0", and the negative direction when "1") expressing the direction in the X-coordinate, and a signal Y_DIR (expressing the positive direction when "0", and the negative direction when "1") expressing the direction in the Y-coordinate, and performs a logical AND operation. The exclusive OR circuit 10 is supplied with the signals X_DIR and Y_DIR, and performs a logical exclusive OR operation. The OR circuit 11 is supplied with a plurality of output signals of the decoding circuit 1, and performs a logical OR operation on all the output signals. The inverters 12 to 14 each performs a logical NOT operation.

The operation of the circuit in FIG. 1 will be described in the respective cases of $(P_i,P_j) \rightarrow \{(C,B),(B,C),(A,D),(D,A)\}$.

(i) The case of $(P_i,P_j) \rightarrow (C,B)$

Both the directions from the point $P_i$ to the point $P_j$ along the axes X and Y are positive. Therefore, both the signals X_DIR and Y_DIR take "0", so that both the values of output signals of the AND circuit 9 and the exclusive OR circuit 10 are "0". All the multiplexers 2 to 8 select their first inputs. $P_{ix}$, $P_{jx}$, $P_{iy}$ and $P_{jy}$ are connected to the X-coordinate input terminal of $P_i$, X-coordinate input terminal of $P_j$, Y-coordinate input terminal of $P_i$ and Y-coordinate input terminal of $P_j$ of the decoding circuit 1 as they are. Since the decoding circuit 1 is a circuit for decoding combinations of coordinates in the case of $(P_i,P_j) \rightarrow (C,B)$ in itself, correct combinations are decoded. The multiplexer 8 outputs the output signal of the OR circuit 11 as it is.

(ii) The case of $(P_i,P_j) \rightarrow (B,C)$

Figure 3:
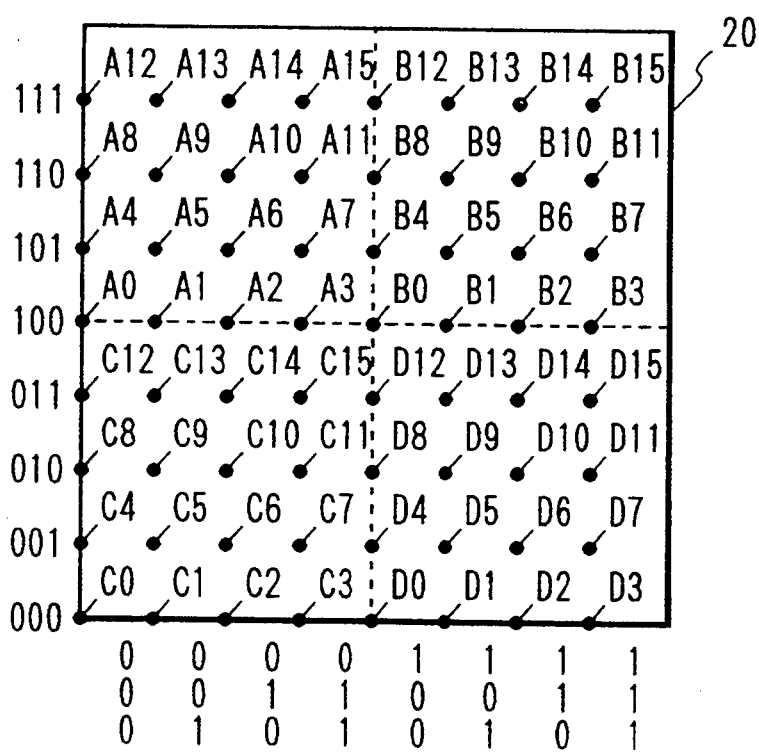
FIG. 3 is a diagram illustrating a window constituted by 64 lattice points.

Both the signals X_DIR and Y_DIR take "1", so that the values of the output signals of the AND circuit 9 and the exclusive OR circuit 10 are "1" and "0" respectively. The multiplexers 2 to 5 select and output their second inputs, and the multiplexers 6 to 8 select and output their first inputs. That is, the coordinate inputs of the points $P_i$ and $P_j$ are interchanged and supplied into the decoding circuit 1. In the case of interchanging the coordinate inputs of the points $P_i$ and $P_j$, combinations of the straight line $P_iP_j$ passing above the point B0 in FIG. 3 are also the same, so that the decoding circuit 1 decodes correct combinations in the same manner as in the case of $(P_i,P_j) \rightarrow (C,B)$.

(iii) The cases of $(P_i,P_j) \rightarrow (A,D)$ and $(D,A)$

One of the signals X_DIR and Y_DIR takes "0" and the other takes "1", so that the values of output signals of the AND circuit 9 and the exclusive OR circuit 10 are "0" and "1" respectively. The multiplexers 2 to 5 select and output their first inputs, and the multiplexers 6 to 8 select and output their second inputs. Therefore, the values of X coordinates of respective points are supplied to the decoding circuit 1 as they are, while the values of Y coordinates are supplied in a reversed state into the decoding circuit 1. The reason why desired outputs can be obtained at this time will be described with reference to FIG. 5.

Figure 5:
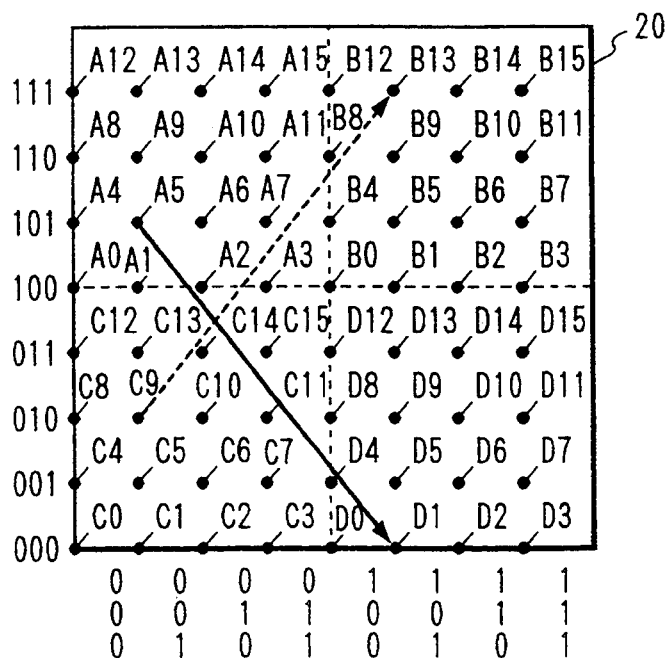
FIG. 5 is a diagram for explaining processing in the case of $(P_i,P_j) \rightarrow (A,D)$ and $(D,A)$.

Now, it is assumed that the point $P_i$ is at a lattice point A5 and the point $P_j$ is at a lattice point D1 as shown in FIG. 5. The binary expressions of the lattice points A5 and D1 are (0.001,0.101) and (0.101,0.000) respectively. Since only the values of the Y-coordinate are supplied in a reversed state, the coordinate inputs of the points $P_i$ and $P_j$ supplied into the decoding circuit 1 are (0.001,0.010) and (0.101,0.111) respectively, so that the combinations from C9 to B13 can be obtained as shown by the dotted line in FIG. 5. The solid and dotted straight lines in FIG. 5 are symmetrical with respect to the straight line $Y = -0.5$.

Therefore, in the cases of $(P_i,P_j) \to (A,D)$ and $(D,A)$, desired outputs can be obtained from the decoding circuit 1 for decoding combinations of coordinates of $(P_i,P_j) \to (C,B)$ by use of the combinations of coordinates the Y-coordinate values of which has been reversed. Since the outputs have reversed forms (while the solid line passes below the lattice point B0, the dotted line passes above it contrarily), the output signal uplow is outputted in a reversed state by use of the inverter 14 and the multiplexer 8.

In the case of $(P_i, P_j) \to (A6,D10)$ and $(P_i,P_j) \to (C10,B6)$ in which the Y-coordinate has been reversed, the straight line $P_iP_j$ in each case passes below the lattice point B0, so that the value of the signal uplow is not correct. This is because the axis of symmetry is $Y = -0.5$, so that this happens when the straight line $P_iP_j$ passes near the lattice point B0. If this error cannot be ignored, the accuracy of the number of bits expressing coordinates may be increased.

Although a circuit configuration of a decoder outputting a signal expressing whether a straight line connecting two points in a window exists above or below a center point has been described in the above embodiment, the present invention can be applied to a decoder for decoding various other relationships upon coordinates.

As has been described, according to the present invention, signals respectively expressing directions along the axes X and Y are inputted, and these two signals and the symmetry of coordinates are used, so that it is not necessary to decode all of desired combinations of coordinates, and it is possible to reduce combinations of coordinates to be decoded. There is therefore an advantage that it is possible to reduce the scale of a decoder. Particularly in a decoder for decoding whether a straight line connecting two points in a window passes above or below a center point of the window, it is possible to reduce the scale of the circuit into about a quarter or less.

In addition, since the circuit can be miniaturized without using any extra circuits, there is another advantage that it is possible to attain the operation at a high speed.

In addition, since the number of circuit connection portions is reduced by the miniaturization, there is still another advantage that it is possible to improve the productivity and economy.

What is claimed is:

1. A symmetrical decoder for graphic processing, comprising:

first input means for receiving initial coordinate signals representing coordinates of two points in a window, processing said initial coordinate signals, and outputting processed coordinate signals;

second input means for receiving initial direction signals representing a direction between the two points in the window, processing said initial direction signals, and outputting processed direction signals; and operation means for determining a relationship between the two points utilizing a previously determined array of sets of coordinates and relationships corresponding to each of the sets of coordinates on the basis of the processed coordinate signals and processed direction signals supplied from said first and second input means, wherein said array is symmetrical around a centerpoint of said window, and wherein said first input means includes a plurality of multiplexers for multiplexing the received initial coordinate signals to provide processed coordinate signals.

2. A symmetrical decoder for graphic processing, comprising:

first input means for receiving initial coordinate signals representing coordinates of two points in a window, processing said initial coordinate signals, and outputting processed coordinate signals;

second input means for receiving initial direction signals representing a direction between the two points in the window, processing said initial direction signals, and outputting processed direction signals; and operation means for determining a relationship between the two points utilizing a previously determined array of sets of coordinates and relationships corresponding to each of the sets of coordinates on the basis of the processed coordinate signals and processed direction signals supplied from said first and second input means, wherein said array is symmetrical around a centerpoint of said window, and wherein said first input means includes an AND circuit and an exclusive OR circuit for electrically processing the received initial direction signals and for providing processed direction signals as control data signals for the first input means.

3. The symmetrical decoder for graphic processing according to claim 1, wherein said second input means includes an AND circuit and an exclusive OR circuit for electrically processing the received initial direction signals, and wherein said plurality of multiplexers are controlled by output signals of said AND circuit and said exclusive OR circuit.

4. A symmetrical decoder for graphic processing, comprising:

first input means for receiving initial coordinate signals representing coordinates of two points in a window, processing said initial coordinate signals, and outputting processed coordinate signals;

second input means for receiving initial direction signals representing a direction between the two points in the window, processing said initial direction signals, and outputting processed direction signals; and operation means for determining a relationship between the two points utilizing a previously determined array of sets of coordinates and relationships corresponding to each of the sets of coordinates on the basis of the processed coordinate signals and processed direction signals supplied from said first and second input means, wherein said array is symmetrical around a centerpoint of said window, said operation means includes a decoding circuit for decoding the processed coordinate signals and providing a plurality of output signals as a decoded output and said operation means for logically determining a relationship between the two points further includes an OR circuit for performing a logical OR operation on the plurality of output signals of said decoding circuit.

* * * * *

UNITED STATES PATENT AND TRADEMARK OFFICE
CERTIFICATE OF CORRECTION

PATENT NO. : 5,388,193
DATED : February 07, 1995
INVENTOR(S) : Tetsuro KAWATA

It is certified that error appears in the above-indentified patent and that said Letters Patent is hereby corrected as shown below:

Claim 2, Column 6, Line 36 "first" should read --second--.

Signed and Sealed this

Thirteenth Day of June, 1995

Attest:

BRUCE LEHMAN

Attesting Officer    Commissioner of Patents and Trademarks